(12) United States Patent
Shinotsuka

(10) Patent No.: US 6,790,504 B2
(45) Date of Patent: Sep. 14, 2004

(54) PHASE-CHANGE OPTICAL INFORMATION RECORDING MEDIUM AND INFORMATION RECORDING AND READING METHOD USING THE RECORDING MEDIUM

(75) Inventor: Michiaki Shinotsuka, Hiratsuka (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 10/674,699

(22) Filed: Sep. 29, 2003

(65) Prior Publication Data
US 2004/0062900 A1 Apr. 1, 2004

Related U.S. Application Data

(63) Continuation of application No. 10/029,100, filed on Dec. 21, 2001, now Pat. No. 6,652,948.

(30) Foreign Application Priority Data
Dec. 21, 2001 (JP) .......................................... 2000-388904

(51) Int. Cl.$^7$ ................................................. B32B 3/02
(52) U.S. Cl. .................... 428/64.1; 428/64.4; 428/64.5; 430/270.13
(58) Field of Search ............................... 428/64.1, 64.4, 428/64.5, 64.6, 913; 430/270.13, 495.1, 954

(56) References Cited

U.S. PATENT DOCUMENTS

| | | | | |
|---|---|---|---|---|
| 6,416,837 B1 | * | 7/2002 | Kojima | 428/64.1 |
| 6,469,977 B1 | * | 10/2002 | Kitaura | 369/275.1 |
| 6,652,948 B2 | * | 11/2003 | Shinotsuka | 428/64.1 |
| 2001/0005350 A1 | * | 6/2001 | Kitaura | 369/94 |

FOREIGN PATENT DOCUMENTS

| | | |
|---|---|---|
| JP | 8124218 | 5/1996 |
| JP | 11039716 | 2/1999 |

* cited by examiner

Primary Examiner—Elizabeth Mulvaney
(74) Attorney, Agent, or Firm—Cooper & Dunham LLP

(57) ABSTRACT

A phase-change optical information recording medium in which information can be recorded, erased, and read includes a substrate and a recording layer overlying the substrate. The recording layer achieves a crystal phase and an amorphous phase. The absorptance Ac of the recording layer in the crystal phase against light having a wavelength of from 370 nm to 450 nm is lower than the absorptance Aa of the recording layer in the amorphous phase against the light. Information is recorded on the recording medium with a recording wavelength of from 370 nm to 450 nm at a recording pitch of 0.3 μm to 0.52 μm.

1 Claim, 1 Drawing Sheet

PHASE-CHANGE OPTICAL INFORMATION RECORDING MEDIUM AND INFORMATION RECORDING AND READING METHOD USING THE RECORDING MEDIUM

CROSS REFERENCE TO RELATED APPLICATION

This application is a continuation of U.S. patent application Ser. No. 10/029,100, filed Dec. 21, 2001, now U.S. Pat. No. 6,652,948 (allowed).

BACKGROUND OF THE INVENTION

1. Field of the Invention

The present invention relates to a phase-change optical information recording medium which includes a recording layer located on a substrate and in which information can be recorded and erased. In particular, the present invention relates to a phase-change optical information recording medium in which information can be recorded and erased utilizing reversible phase-change of the recording layer between an amorphous phase and a crystal phase. In addition, the present invention also relates to an information recording and reading method using the phase-change optical information recording medium.

2. Description of the Related Art

Japanese Laid-Open Patent Publication No. 8-124218 discloses a phase-change optical information recording medium in which information can be recorded and erased utilizing mark edge recording. The disclosed optical recording medium is prepared by forming a first dielectric layer, a recording layer, a second dielectric layer, a reflecting layer, a third dielectric layer, and a UV curable resin layer on a substrate in this order. The reflecting layer is formed of a transparent ultra-thin film of a metal, Si, or Ge. The third dielectric layer is formed of a dielectric material having a refractive index n more than 1.5. The medium satisfies the following relationship:

$$Ac > Aa$$

wherein Ac represents the absorptance in a crystalline state and Aa represents the absorptance in an amorphous state.

In this known art, an optical information recording medium having a crystalline absorptance Ac larger than the amorphous absorptance Aa (that is, the recording medium having a crystalline reflectance smaller than the amorphous reflectance) is provided. However, the recording medium has a drawback in that the medium does not have compatibility with CD-ROMs in view of reflectance.

Japanese Laid-Open Patent Publication No. 11-39716 discloses a medium having such a large refractive index as 2.2 to 2.3; however, the reflectance and characteristics of the medium having such a large refractive index widely change because the variation of the film thickness seriously influences on the characteristics.

SUMMARY OF THE INVENTION

Accordingly, an object of the present invention is to provide a phase-change optical information recording medium which can perform high density recording using light having a relatively short wavelength such as blue light and which can perform recording and reading while having compatibility with CD-ROMs.

Another object of the present invention is to provide an information recording method by which information can be recorded in the recording medium at a high density.

According to an aspect of the present invention, there is provided a phase-change optical information recording medium in which information can be recorded, erased and read and which includes a substrate and a recording layer located overlying the substrate. The recording layer achieves a crystal phase and an amorphous phase, and the light energy absorptance Ac of the recording layer in the crystal phase is lower than the light energy absorptance Aa thereof in the amorphous phase. Information is preferably recorded in the medium with light having a wavelength of from 370 to 450 nm at a recording pitch of from 0.3 $\mu$m to 0.52 $\mu$m.

This recording medium can perform high density recording, and in addition since the refractive index of the recording layer in the crystal phase is higher than that in the amorphous phase, the medium has compatibility with CD-ROMs.

Information is preferably recorded in the phase-change optical information recording medium while maintaining the ratio of the recording pitch to the recording beam diameter ($1/e^2$) in the range of from 0.5 to 0.9, and more preferably from 0.6 to 0.85. When the ratio is too small, the adjacent track tends to be erased, resulting in increase of errors. To the contrary, when the ratio is too large, the recording capacity of the medium decreases.

This recording medium can perform high density recording, and in addition since the refractive index of the recording layer in the crystal phase is higher than that in the amorphous phase, the medium has compatibility with CD-ROMs.

In addition, information is preferably recorded at a recording density of from 0.05 to 0.16 $\mu$m/bit, and more preferably from 0.11 to 0.16 $\mu$m/bit. When the recording density is less than 0.11 $\mu$m/bit, the signal amplitude decreases, resulting in increase of errors.

This recording medium can perform high density recording, and in addition since the refractive index of the recording layer in the crystal phase is higher than that in the amorphous phase, the medium has a compatibility with CD-ROMs.

The phase-change optical information recording medium of the present invention preferably includes a lower protective layer located between the substrate and the recording layer, an upper protective layer located on the recording layer, a heat dissipation layer located on the upper protective layer, and a UV curable resin layer located on the heat dissipation layer. The refractive index of the lower and the upper protective layers is preferably from 1.8 to 2.19.

In this recording medium, information can be recorded even with such a short wavelength as about 400 nm, e.g., blue light.

The recording layer preferably includes Ag, In, Sb and Te so that the information can be highly sensitively recorded and read, and overwritten in the medium.

The substrate preferably has grooves with a depth of from 25 nm to 50 nm, and more preferably from 25 to 35, so that the information can be recorded and read with stable tracking even when using short wavelength light. When the depth is too large, the difference in reflectance between the recording medium and CD-ROMs increases, and therefore, it becomes hard to detect signals.

The recording layer preferably has a thickness of from 7 nm to 20 nm, and more preferably from 7 to 15 nm, so that information can be recorded and read with stable tracking even when using short wavelength light. When the thickness is too large, the jitter deteriorates, resulting in increase of errors.

Information is preferably recorded therein and read therefrom at a line speed of 1.2 m/s to 14.0 m/s so that high speed recording (overwriting) can be performed even when using short wavelength light.

In the another aspect of the present invention, an information recording method is provided which includes the steps of providing a phase-change optical information recording medium comprising a substrate and a recording layer located overlying the substrate and achieving a crystal phase and an amorphous phase, wherein the recording layer satisfies the following relationship:

Ac<Aa wherein Ac represents an absorptance of the recording layer in the crystal phase against light having a wavelength of from 370 nm to 450 nm and Aa represents an absorptance of the recording layer in the amorphous phase against the light having a wavelength of from 370 nm to 450 nm; and recording information in the recording layer using light having a wavelength of from 370 to 450 nm at a recording pitch of from 0.3 to 0.52 μm.

In yet another aspect of the present invention, an information recording and reading method is provided which includes the medium providing step and the information recording step mentioned above, and reading the information with light at a speed of from 1.2 m/s to 14.0 m/s.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Figure 1:
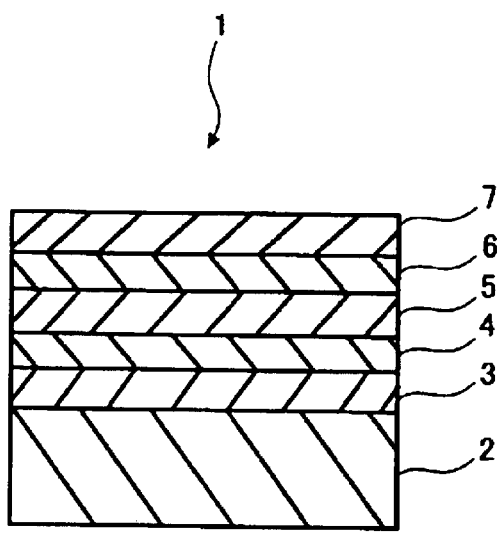
FIG. 1 is a schematic view illustrating the cross-section of an embodiment of the phase-change optical information recording medium of the present invention.

FIG. 1 is a cross-sectional view of an embodiment of the phase-change optical information recording medium of the present invention. A phase-change optical information recording medium 1 includes a lower protective layer 3, a recording layer 4, an upper protective layer 5, a heat dissipation layer 6, and an ultraviolet curable resin layer 7, which are overlaid in this order on a transparent substrate 2 formed of, for example, polycarbonate. The lower and the upper protective layers 3 and 5 are formed of a dielectric material such as $ZnS.SiO_2$ or $SiNx$. The recording layer 4 is formed of a phase-change material such as Ag—In—Sb—Te or Ge—Sb—Te, and the heat dissipation layer 6 is formed of a high heat conductive material such as Al, Al alloys, Au or Ag.

The structure and materials of the recording material are not limited to the structure and materials described above, but the structure and the materials mentioned above are preferable because the recording, reading and overwriting characteristics of the medium can be improved.

The phase-change optical information recording medium 1 may be in the form of disk (phase-change optical disk), card, or sheet.

Information is recorded in the phase-change recording medium using short wavelength light of 370 to 450 nm, such as light in a blue wavelength region. Since the recording pitch of the medium is 0.3 to 0.52 μm, it is possible that the medium has a recording capacity in the radial direction 1.4 to 2.4 times larger than that of a 4.7 GB DVD having a pitch of 0.74 μm.

The inventors have investigated the characteristics of the phase-change recording medium of the present invention. The tested medium has a polycarbonate substrate 2 of 0.6 mm thick, a lower protective layer 3 of 40 μm thick formed of $ZnS.SiO_2$, a recording layer 4 of 15 nm thick formed of Ag—In—Sb—Te, an upper protective layer 5 of 15 nm thick formed of $ZnS.SiO_2$, and a heat dissipation layer 6 of 120 μm thick formed of Ag. The ultraviolet curable resin layer 7 of the medium has a thickness of 6 μm. The tested medium is in the form of disc. The crystalline absorptance Ac and the amorphous absorptance Aa are 0.7 and 0.85, respectively; hence the relationship between the absorptances, Ac<Aa, is satisfied.

Figure 2:
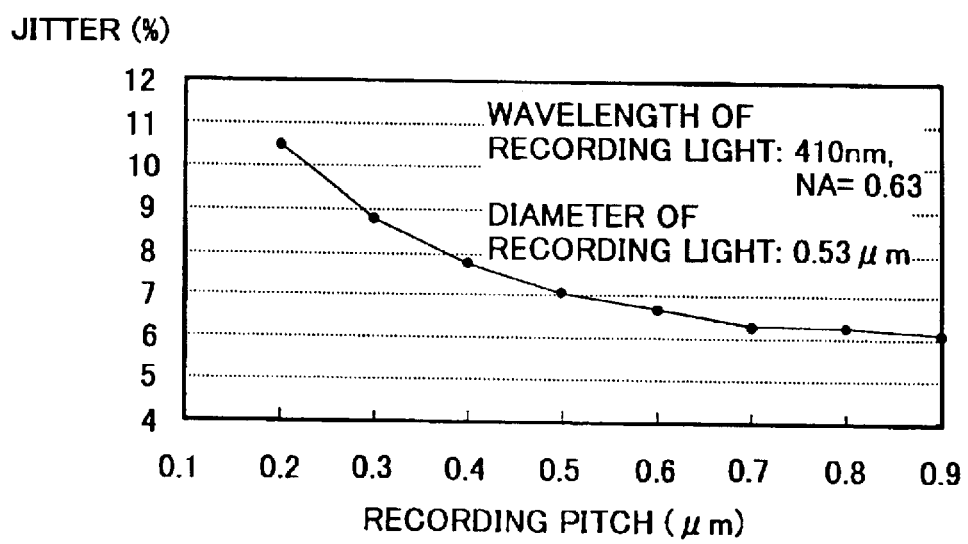
FIG. 2 is a graph showing the relationship between the recording pitch and jitter in the phase-change optical information recording medium of the present invention.

FIG. 2 shows a relationship between the recording pitch and jitter in the phase-change optical information recording medium 1 of the present invention, wherein NA represents the numerical aperture. As can be understood from FIG. 2, when information is recorded using blue light having a wavelength of about 400 nm at a recording pitch of 0.3 μm, the jitter can be decreased to 9% or less of a window width Tw even though crosstalk is exhibited. When the jitter is 9% or less and the error correction is almost equal to that of DVDs, the medium and the drive therefor can be put to practical use.

According to the present invention, when recording with blue light is performed at a recording pitch of 0.3 μm to 0.52 μm while maintaining the ratio of the recording pitch to the recording beam diameter ($1/e^2$) in the range of from 0.5 to 0.9 and, high density recording can be performed, and in addition crystalline reflectance can be higher than the amorphous reflectance, resulting in achievement of CD-ROM compatibility.

The present inventors have investigated the relationship between the ratio of the recording pitch to the recording beam diameter ($1/e^2$) and the recording capacity. The results are shown in Table 1. The recording density cannot be increased when the recording pitch is equal to the beam diameter. As can be understood from Table 1, as the ratio of the recording pitch to the recording beam diameter ($1/e^2$) decreases, the recording capacity increases. In the present invention, therefore, the ratio of the recording pitch to the recording beam diameter. ($1/e^2$) is controlled so as to be 0.5 to 0.9, and the recording pitch is also controlled so as to be narrower than the conventional pitch of 0.6 or 0.74 μm, so that the recording capacity can be increased.

TABLE 1

| Recording pitch/beam diameter ($1/e^2$) | Recording capacity (GB) |
| --- | --- |
| 0.5 | 22 |
| 0.6 | 18 |
| 0.7 | 16 |
| 0.8 | 14 |
| 0.9 | 12 |

Beam diameter = 0.55 μm;
Line recording density = 0.16 μm/bit

According to the present invention, the line recording density is controlled so as to be 0.05 μm/bit to 0.16 μm/bit and the recording pitch is controlled so as to be 0.3 μm to 0.52 μm, and therefore high density recording can be performed, and in addition the crystalline reflectance can be higher than the amorphous reflectance, resulting in achievement of CD-ROM compatibility. Table 2 shows the relationship between the line recording density and the recording capacity. As can be understood from Table 2, when the line recording density is 0.05 μm/bit to 0.16 μm/bit, a recording capacity of about 10 GB or more can be achieved.

TABLE 2

| Line recording density (μm/bit) | Recording capacity (GB) |
|---|---|
| 0.05 | 33 |
| 0.1 | 16 |
| 0.15 | 11 |
| 0.16 | 10 |
| 0.2 | 7 |

Recording pitch = 0.52 μm;
Recording line velocity = 2.5 m/s

When the refractive index of the lower and the upper protective layers 3 and 5 is 1.8 to 2.19, the transmittance is 80% or more, as shown in Table 3; hence, the light is sufficiently transmitted to the recording layer. In addition, when the refractive index is 1.8 to 2.19, an optical enhancement effect can be exerted, the blue wavelength reflectance can be increased to 20% or more, and the reflectance variation ((max. value−min. value)/average value) at the medium surface is less than 20%; hence satisfactory characteristics can be exhibited. In contrast, when the reflectance is 2.2 or more, the medium has a large reflectance variation of 20% or more.

At this point, the reflectance and refractive index of the recording medium are measured by an instrument, spectroellipsometer WVASE32 manufactured by J. A. Woolam, by which the refractive index, thickness and reflectance can be measured at the same time. The reflectance can be calculated by the refractive index and thickness using an equation for multiple reflection.

As mentioned above, the reflectance variation is determined as ((max. value−min. value)/average value).

Variation of refractive index and thickness is determined as follows:

(1) refractive index and thickness at 10 points of a disc (120 mm in diameter) (i.e., 22, 26, 30, 34, 38, 42, 46, 50, 54 and 58 mm points from the center of the disc) are measured by the ellipsometer;
(2) the procedure for measurements in paragraph (1) is repeated 8 times while the direction of the ten measurement points is changed by 45 degree (i.e., refractive index and thickness of 80 points in total of the disc are measured); and
(3) the variation of the refractive index and thickness are determined by the equation mentioned above.

TABLE 3

| Refractive index (recording film) | Transmittance (recording film) (%) | Reflectance variation (%) |
|---|---|---|
| 1.8 | 92 | 8 |
| 1.9 | 91 | 8 |
| 2.0 | 90 | 10 |
| 2.1 | 89 | 15 |
| 2.15 | 88 | 16 |
| 2.19 | 87 | 19 |

TABLE 3-continued

| Refractive index (recording film) | Transmittance (recording film) (%) | Reflectance variation (%) |
|---|---|---|
| 2.2 | 85 | 20 |
| 2.3 | 80 | 25 |

According to the present invention, the recording layer mainly includes Ag, In, Sb, and Te, and therefore high sensitive recording, reading, and overwriting can be performed. In Table 4, the characteristics of the Ag—In—Sb—Te recording layer is compared with those of a Ge—Sb—Te recording layer. By using Ag, In, Sb, and Te for the recording layer, the jitter and recording sensitivity can be improved.

TABLE 4

| Recording layer materials | Initial jitter (σ/Tw) (%) | Recording sensitivity (mW) |
|---|---|---|
| Ag—In—Sb—Te | 6.8 | 7 |
| Ge—Sb—Te | 9.1 | 9 |

Recording conditions
Wavelength of light: 410 nm
Numerical aperture: 0.63
Recording power: 8 mW
Line recording density: 0.165 μm/bit
Recording pitch: 0.52 μm
Recording speed (line speed): 5.0 m/s Further, in the present invention the depth of grooves of the substrate is preferably 25 nm to 50 nm. Table 5 shows the relationship between the groove depth and the initial jitter, reflectance, modulation, and tracking. When the groove depth is 25 to 50 nm, the jitter is 9% or less, the reflectance is about 15%, and the modulation is 50% or more. In addition, the tracking is good. More preferably, the groove depth is 25 nm to 35 nm.

TABLE 5

| Groove depth (nm) | Initial jitter (σ/Tw) (%) | Reflectance (%) | Modulation (%) | Tracking |
|---|---|---|---|---|
| 15 | — | — | — | no good |
| 20 | 7.1 | 24 | 65 | Good |
| 25 | 6.9 | 22 | 64 | Good |
| 30 | 7.3 | 21 | 60 | Good |
| 35 | 8.2 | 18 | 58 | Good |
| 40 | 8.9 | 17 | 55 | Good |
| 45 | 9.3 | 15 | 50 | Good |
| 50 | 11.8 | 12 | 44 | Good |

Recording conditions
Wavelength of lights: 410 nm
Numerical aperture: 0.63
Recording power: 8 mW
Line recording density: 0.165 μm/bit
Recording pitch: 0.52 μm
Recording speed (line speed) 5.0 m/s The thickness of recording layer is preferably 7 nm to 20 nm so that the initial jitter becomes about 8% or less of the window width (Tw), the high reflectance is 18% or more, and the jitter after overwriting is satisfactory, which can be understood from Table 6 below.

TABLE 6

| Recording layer thickness (nm) | Initial jitter (σ/Tw) (%) | Reflectance (%) | Jitter after overwriting (σ/Tw) (%) |
| --- | --- | --- | --- |
| 5 | 6.5 | 15 | 12 |
| 8 | 7 | 18 | 10 |
| 11 | 7.2 | 19 | 8 |
| 14 | 7 | 20 | 8.2 |
| 17 | 7.8 | 21 | 9 |
| 20 | 8.5 | 22 | 10 |
| 23 | 9.3 | 25 | 13.2 |

Evaluation conditions
Wavelength of light: 410 nm
Numerical aperture: 0.63
Recording power: 8 mW
Line recording density: 0.165 μm/bit
Recording pitch: 0.52 μm
Recording speed (line speed): 5.0 m/s

EFFECT OF THE PRESENT INVENTION

According to the present invention, a phase-change optical information recording medium which can perform high density recording using light having a relatively short wavelength such as blue light and which can perform recording and reading while having compatibility with CD-ROMs can be provided.

Additional modifications and variations of the invention are possible in light of the above teachings. It is therefore to be understood that within the scope of the appended claims the invention may be practiced other than as specifically described herein.

This document claims priority and contains subject matter related to Japanese Patent Application No. 2000-388904, filed on Dec. 21, 2000, the entire contents of which are herein incorporated by reference.

What is claimed is:

1. A phase-change optical information recording medium in which information can be recorded, erased and read, comprising:

a substrate; and a recording layer located overlying the substrate and achieving a crystal phase and an amorphous phase, wherein the recording layer satisfies the following relationship:

$$Ac < Aa$$

wherein Ac represents an absorptance of the recording layer in the crystal phase against light having a wavelength of from 370 nm to 450 nm and Aa represents an absorptance of the recording layer in the amorphous phase against the light having a wavelength of from 370 nm to 450 nm; and wherein information is recorded in the recording layer with light having a wavelength of from 370 nm to 450 nm at a recording density of 0.05 μm/bit to 0.16 μm/bit.

* * * * *